(12) United States Patent
Chang et al.

(10) Patent No.: US 10,529,993 B2
(45) Date of Patent: Jan. 7, 2020

(54) CATALYST FOR FUEL CELL AND METHOD FOR MANUFACTURING THE SAME

(71) Applicant: National Taiwan University of Science and Technology, Taipei (TW)

(72) Inventors: Sun-Tang Chang, Taipei (TW); Chen-Hao Wang, Taipei (TW); Chia-Chi Liu, Taipei (TW); Huan-Ping Jhong, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 189 days.

(21) Appl. No.: 15/831,407

(22) Filed: Dec. 5, 2017

(65) Prior Publication Data

US 2018/0166694 A1    Jun. 14, 2018

(30) Foreign Application Priority Data

Dec. 9, 2016   (TW) .............................. 105140962 A (51) Int. Cl.
*H01M 4/90*   (2006.01)
*H01M 8/10*   (2016.01)
*H01M 4/88*   (2006.01)

(52) U.S. Cl.
CPC ............... *H01M 4/90* (2013.01); *H01M 4/88* (2013.01); *H01M 4/8882* (2013.01); *H01M 4/9083* (2013.01); *Y02P 70/56* (2015.11)

(58) Field of Classification Search
CPC ........ H01M 4/88; H01M 4/8882; H01M 4/90; H01M 4/9083; H01M 8/10; Y02P 70/56
See application file for complete search history.

(56) References Cited

U.S. PATENT DOCUMENTS

| 2007/0196723 A1 | 8/2007 | Jeon et al. |
| 2011/0076598 A1 | 3/2011 | Chen et al. |
| 2013/0011765 A1 | 1/2013 | Asazawa et al. |

FOREIGN PATENT DOCUMENTS

| CN | 1199973 C | 5/2005 |
| CN | 1234709 C | 1/2006 |
| CN | 1824385 A | 8/2006 |
| CN | 1930709 A | 3/2007 |
| CN | 101175570 A | 5/2008 |
| CN | 101859906 A | 10/2010 |
| CN | 102013495 A | 4/2011 |
| CN | 102423705 A | 4/2012 |
| CN | 105524072 A | 4/2016 |
| EP | 2759546 A1 | 7/2014 |

(Continued)

OTHER PUBLICATIONS

Sun-Tang Chang et al, Vitalizing fuel cells with vitamins: pyrolyzed vitamin B12 as a non-precious catalyst for enhanced oxygen reduction reaction of polymer electrolyte fuel cells, Energy & Environmental Science, 2012, 5, 5305-5314.

(Continued)

*Primary Examiner* — Brittany L Raymond
(74) *Attorney, Agent, or Firm* — CKC & Partners Co., LLC (57) ABSTRACT

A method for manufacturing a catalyst for fuel cell includes: providing or receiving magnesium porphyrin-containing powder; mixing the magnesium porphyrin-containing powder with a carbon-containing carrier powder to form a first mixture, and performing a thermal treatment to pyrolyze the first mixture to form the catalyst for fuel cell. A catalyst for fuel cell is also provided herein.

3 Claims, 5 Drawing Sheets

(56) References Cited

FOREIGN PATENT DOCUMENTS

| | | |
|---|---|---|
| TW | 201111386 A1 | 4/2011 |
| TW | 201217411 A1 | 5/2012 |
| TW | I481106 B | 4/2015 |

OTHER PUBLICATIONS

S.-T. Chang et al, Preparation of non-precious metal catalysts for PEMFC cathode from pyrolyzed vitamin B12, International journal of hydrogen energy, 2012, 37, 13755-13762.
E. Proietti et al, Iron-based cathode catalyst with enhanced power density in polymer electrolyte membrane fuel cells, Nature Communications, Aug. 2, 2011.
Gang Wu et al, High-Performance Electrocatalysts for Oxygen Reduction Derived from Polyaniline, Iron, and Cobalt, Science vol. 332, Apr. 22, 2011, 443-447.
H.-C. Huang et al, Pyrolyzed Cobalt Corrole as a Potential Non-Precious for Fuel Cells, Adv. Funct. Mater. 2012, 22, 3500-3508.
Michel Lefèvre et al, Iron-Based Catalysts with Improved Oxygen Reduction Activity in Polymer Electrolyte Fuel Cells, science vol. 324, Apr. 3, 2009, 71-74.
R. Bashyam and P. Zelenay, A class of non-precious metal composite catalysts for fuel cells, Nature, Sep. 7, 2006, vol. 443, 63-66.
R. Jasinski, A New Fuel Cell Cathode Catalyst, Nature, Mar. 21, 1964, vol. 201, 1212-1213.
Fan-Ying Liao, Effect of Compost Conditions on Power Performance of Miniaturized Microbial Fuel Cells, http://hdl.handle.net/11296/ndltd/15209011060287598316, Jan. 28, 2013.

CATALYST FOR FUEL CELL AND METHOD FOR MANUFACTURING THE SAME

This application claims priority to Taiwan Application Serial Number 105140962, filed Dec. 9, 2016, which is herein incorporated by reference.

BACKGROUND

Field of Invention

The present invention relates to a catalyst. More particularly, the present invention relates to a catalyst for fuel cell and a method for manufacturing the catalyst.

Description of Related Art

A fuel cell is a device converting chemical energy into electrical energy via oxidation-reduction reaction. For example, proton exchange membrane fuel cell (PFMEC), catalyzes oxidation reaction of methanol or hydrogen at the cathode and reduction reaction of oxygen at the anode. The only product of fuel cells is water, so they are essentially zero pollution fuel and provide "green energy". Fabrication of anode catalyst have typically been made by mixing precious metal precursors with organic substances, and performing a thermal treatment in a traditional furnace to pyrolyze the catalyst under 300° C. to 1200° C. for a duration from 4 to 8 hours. However, in addition to anode catalyst that generally requires expensive precious metals (e.g. platinum-based anode catalyst), toxic solvents are widely used in the process of fabrication, such as chloroform and dimethylformamide, which are eco-unfriendly.

In 1964, Jasinski et al. firstly reported the use of non-precious metal catalyst for fuel cell. In the subsequent years, more and more scientists have started to utilize non-precious metals, such as iron macrocyclic complexes and cobalt macrocyclic complexes, as materials of catalyst for fuel cell. For example, in 2012, Chang et al. reported that pyrolyzed vitamin B12 can be used as non-precious catalyst for enhanced oxygen reduction reaction of polymer electrolyte fuel cell. As such, there is a continuing need for alternative catalyst for fuel cell that can maintain high performance, lower material costs and enhance catalyst durability.

SUMMARY

Methods for manufacturing a catalyst are disclosed herein. One method for manufacturing a catalyst for fuel cell, including: providing or receiving a magnesium porphyrin-containing powder; mixing the magnesium porphyrin-containing powder with a carbon-containing carrier powder to form a first mixture; and performing a thermal treatment to the first mixture to pyrolyze the first mixture to form the catalyst for fuel cell.

The present disclosure also provides a catalyst for fuel cell, the catalyst including a magnesium porphyrin and a carbon carrier, and including at least six elements, the six elements including oxygen, carbon, nitrogen, sulfur, silicon and magnesium, wherein a molar percentage of oxygen in the six elements is about 31.3 to about 37.3 mol %, a molar percentage of carbon in the six elements is about 40.04 to about 47.61 mol %, a molar percentage of nitrogen in the six elements is about 13.7 to about 16.8 mol %, a molar percentage of sulfur in the six elements is about 2.62 to about 4.34 mol %, a molar percentage of silicon in the six elements is about 1.38 to about 3.1 mol %, and a molar percentage of magnesium in the six elements is about 1.75 to about 1.87 mol %.

These and other features, aspects, and advantages of the present disclosure will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment when read with the accompanying figures.

DETAILED DESCRIPTION

The following disclosure provides detailed description of many different embodiments, or examples, for implementing different features of the provided subject matter. These are, of course, merely examples and are not intended to limit the invention but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Figure 1:
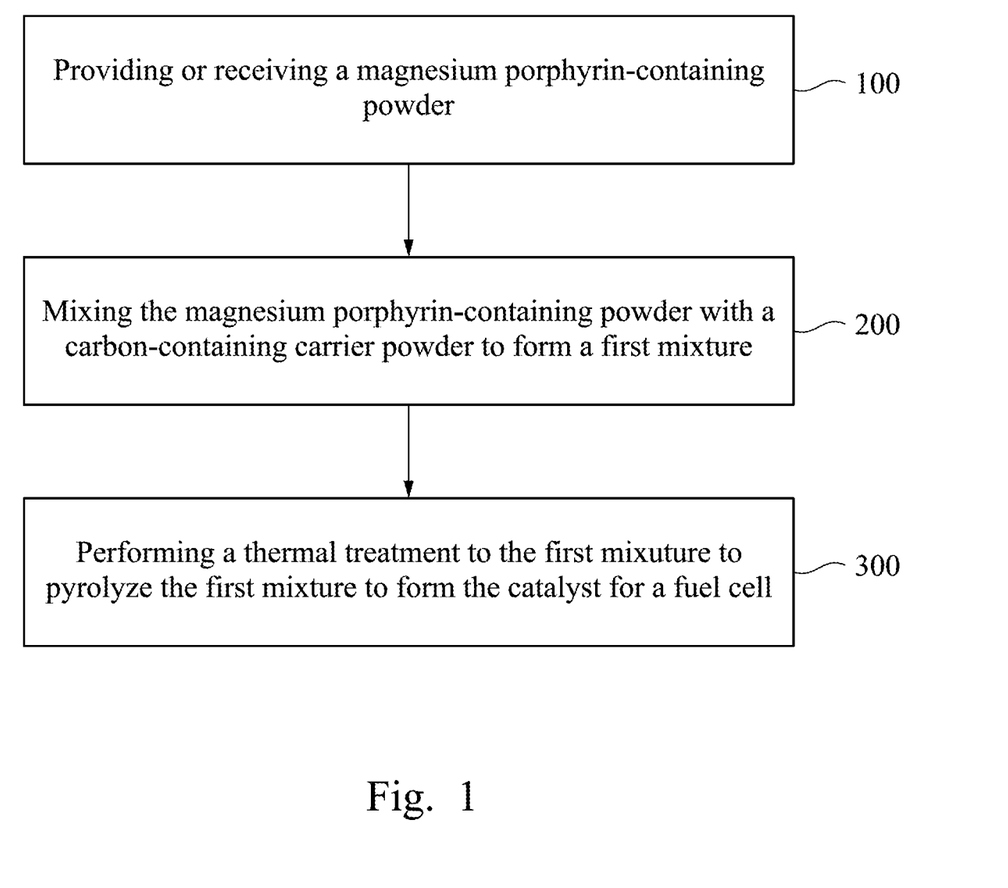
FIG. 1 is a flow chart illustrating a method for manufacturing a catalyst for fuel cell in accordance with various embodiments of the present disclosure.

FIG. 1 is a flow chart illustrating a method for manufacturing a catalyst for fuel cell in accordance with various embodiments of the present disclosure. Referring to FIG. 1, the method for manufacturing the catalyst for fuel cell includes following steps: providing or receiving a magnesium porphyrin-containing powder (step 100); mixing the magnesium porphyrin-containing powder and a carbon-containing carrier powder to form a first mixture (step 200); and performing a thermal treatment to the first mixture to pyrolyze the first mixture to form the catalyst for fuel cell (step 300). Each step described above will be described in detail hereinafter.

First, in step 100, a magnesium porphyrin-containing powder is provided. In one embodiment, magnesium porphyrin-containing powder includes at least six elements: oxygen, carbon, nitrogen, sulfur, silicon and magnesium. In one embodiment, magnesium porphyrin-containing powder can be any kind of powder of porphyrin having a magnesium core in its tetrapyrrolic macrocycle. In some embodiments, magnesium porphyrin-containing powder includes chlorophyll, chlorophyll derivatives or a combination thereof.

In some embodiments, the approach of implementing the step of providing or receiving the magnesium porphyrin-containing powder includes steps described below. First, a bulk magnesium porphyrin source is provided. In some embodiments, the bulk magnesium porphyrin source can be any kind of source of bulk material, and include porphyrin having a magnesium core in its tetrapyrrolic macrocycle. In various embodiments, the bulk magnesium porphyrin source is a plant leaf containing chlorophyll. However, the embodiments described above are not intended to limit the present disclosure to a specific type of plant leaves. In various embodiments, any kind of plant leaf containing chlorophyll is suitable for implementing the present disclosure. Moreover, the bulk magnesium porphyrin source may be other materials rather than plant leaves, such as artificial synthetic or processed magnesium porphyrin-containing materials, in accordance with various embodiments of the present disclosure.

Next, the bulk magnesium porphyrin source is mixed with a first liquid. The first liquid may be, for example, alcohols, water, or a combination thereof, which is eco-friendly. The alcohols may be monohydric alcohols. The monohydric alcohols, for example, include methanol, ethanol, 1-propanol, isopropanol, 1-butanol, 2-butanol, 3-butanol, isobutanol, 1-hexanol, 1-heptanol, 1-octanol or 1-decanol. These solutions may be used either alone or in combination with another one. Preferably, the first liquid is ethanol, water, or a combination thereof.

Then, the bulk magnesium porphyrin source is pulverized in the first liquid to form a mash. After forming the mash, the first liquid is removed from the mash so as to form the magnesium porphyrin-containing powder. The approach for pulverizing the bulk magnesium porphyrin source in the first liquid can be performed with any known pulverizing process. In the pulverized mash, the bulk magnesium porphyrin-containing source is uniformly dispersed in the first liquid. In one embodiment, the step of pulverization can be performed with any known machine. In one embodiment, mechanical pulverization may be performed by using pulverizing machine or grinding machine. These are, of course, merely examples and are not intended to be limiting.

Because the bulk magnesium porphyrin source, as described above, abounds in nature and can be accessed easily, it is cheaper than traditional precious metals (e.g., platinum) used in manufacturing fuel cell, and therefore manufacturing cost can be substantially reduced according to the embodiments disclosed herein.

In step 200, the magnesium porphyrin-containing powder is mixed with the carbon-containing carrier powder to form the first mixture. In one embodiment, the carbon-containing carrier powder may be carbon nanotubes, graphene, graphite, carbon black, or a combination thereof.

In some embodiments, the approach of mixing the magnesium porphyrin-containing powder with the carbon-containing carrier powder includes steps described below. First, the magnesium porphyrin-containing powder and the carbon-containing carrier powder are mixed with a second liquid to form a liquid suspension, in which the magnesium porphyrin-containing powder and the carbon-containing carrier powder are suspended in the second liquid. In some embodiments, the mixing step is conducted by using magnetic stirrer or mechanical stirrer. In one embodiment, the mixing step may be conducted by using either a single approach or in combination with another one. In one embodiment, the step for mixing the magnesium porphyrin-containing powder with the carbon-containing carrier powder includes: mixing about 2.5 to about 3.5 parts by weight of the magnesium porphyrin-containing powder with about 1.5 to about 2.5 parts by weight of the carbon-containing carrier powder.

The second liquid may be, for example, alcohols, water, or a combination thereof, which is eco-friendly. The alcohols may be monohydric alcohols. The monohydric alcohols, for example, include methanol, ethanol, 1-propanol, isopropanol, 1-butanol, 2-butanol, 3-butanol, isobutanol, 1-hexanol, 1-heptanol, 1-octanol or 1-decanol. The alcohol may be used either alone or in combination with another one. In examples, the second liquid is preferably ethanol, water or a combination thereof. In one embodiment, the first liquid is the same as the second liquid. In another embodiment, however, the first liquid is different from the second liquid.

Next, the liquid suspension is sonicated for thoroughly mixing the magnesium porphyrin-containing powder and carbon-containing carrier powder in the liquid suspension. In one embodiment, the liquid suspension is sonicated by a sonicator for a duration time ranged from about 30 to about 60 minutes.

After the formation of the liquid suspension, the second liquid is removed from the sonicated liquid suspension to obtain the first mixture. In some embodiments, the second liquid in the liquid suspension may be removed by decompression drying methods. Since the liquid suspension is well mixed via sonication, the magnesium porphyrin-containing powder is substantially homogeneously distributed on the carbon-containing carrier powder in the first mixture which is obtained by removing the second liquid.

In step 300, a thermal treatment is performed to the first mixture to pyrolyze the first mixture, thereby forming the catalyst for fuel cell. The thermal treatment may be any acceptable process, such as heating the first mixture by using a furnace or microwave device. In one embodiment, the power of the microwave device may be set in a range of 200 W-1100 W. In one embodiment, the power of the microwave device may be 700 W. In another embodiment, the microwave treatment may be performed for a duration time of about 1 to about 3 minutes. In one example, the microwave treatment may be performed for 2 minutes.

In some embodiments, the microwave treatment may avoid decomposition of the magnesium porphyrin structure in the magnesium porphyrin-containing powder. More specifically, microwave treatment may prevent the $N_4$-macrocyclic structure from decomposition, and the active sites (i.e., Mg—N—C structure) of the magnesium porphyrin may be retained. In some preferable embodiments, by using the microwave treatment, the magnesium porphyrin-containing powder retains most —C—S—C— groups, and no —C—$SO_x$—C— group is existed.

The catalyst for fuel cell, prepared by the steps described above, includes a magnesium porphyrin and a carbon carrier. In some embodiments, the catalyst includes at least six elements including oxygen, carbon, nitrogen, sulfur, silicon and magnesium, wherein a molar percentage of oxygen in the six elements is about 31.3 to about 37.3 mol %, a molar percentage of carbon in the six elements is about 40.04 to about 47.61 mol %, a molar percentage of nitrogen in the six elements is about 13.7 to about 16.8 mol %, a molar percentage of sulfur in the six elements is about 2.62 to about 4.34 mol %, a molar percentage of silicon in the six elements is about 1.38 to about 3.1 mol %, and a molar percentage of magnesium in the six elements is about 1.75 to about 1.87 mol %. In some embodiments, the catalyst includes quaternary-type nitrogen, pyrrole-type nitrogen and cyanide, and when a total molar percentage of quaternary-type nitrogen, pyrrole-type nitrogen and cyanide is regarded as 100%, the molar percentage of quaternary-type nitrogen is about 15.2 to about 36.1 mol %, the molar percentage of pyrrole-type nitrogen is about 41.2 to about 68.2 mol %, and the molar percentage of cyanide is about 18.2 to about 22.7 mol %. In some embodiments, the catalyst includes —C—S—C— groups and —C—SO$_x$—C— groups, and when a total molar percentage of the —C—S—C— groups and —C—SO$_x$—C— groups is regarded as 100%, the molar percentage of the —C—S—C— group is about 69.4 to about 100 mol %, and the molar percentage of —C—SO$_x$—C— groups is about 0 to about 30.6 mol %, wherein x is an integer ranged from 0 to 6.

EXAMPLES

Examples 1-5

First, leaves of any plant (e.g. ficus tree, blackboard tree, kapok tree, etc.) were immersed in ethanol, and then introduced into a juicer machine to be thoroughly cut up and evenly mixed with ethanol, thereby obtaining mashed leaves. Then the mashed leaves were dried in a vacuum oven to obtain leaves powder. 300 mg of leaves powder was mixed with 200 mg of carbon black (XC-72R) and 10 mL of ethanol. The obtained mixture was sonicated for about 30 to about 60 minutes such that the leaves powder and carbon black were evenly dispersed in ethanol. Next, after removing ethanol by using a rotary evaporator (Eyela, N1100), a dried and well mixed first mixture of leaves powder and carbon black was obtained. The first mixture was put in a ceramic or alumina crucible and then the ceramic or alumina crucible was put in a beaker that was stuffed with thermal insulation wool fibers. The beaker containing the first mixture was subjected to a microwave treatment. The microwave treatment was conducted by using a microwave oven (Panasonic, ST557). In exemplary embodiments of the present disclosure, the catalysts of Examples 1-5 were synthesized with different microwave treatment powers and different microwave treatment times listed below in Table 1.

TABLE 1

|  | Power (watts) | Time (minutes) |
| --- | --- | --- |
| Example 1 | 700 | 1 |
| Example 2 | 700 | 2 |
| Example 3 | 700 | 3 |
| Example 4 | 400 | 1 |
| Example 5 | 400 | 2 |

Comparative Example 1

In Comparative Example 1, a catalyst was prepared in a manner similar to these described in Examples, except that no leaves were provided in the first mixture. As such, the catalyst of Comparative Example 1 is a carbon black-based catalyst.

Comparative Example 2

In Comparative Example 2, a catalyst was prepared in a manner similar to these described in Examples, except that no carbon black was provided in the first mixture. As such, the catalyst of Comparative Example 2 is a leaves powder-based catalyst.

Comparative Example 3

In Comparative Example 3, a catalyst was prepared in a manner similar to these described in Examples, except that the leaves were replaced with platinum (Pt) in the first mixture. As such, the catalyst of Comparative Example 3 is a Platinum/Carbon black-based catalyst.

In Examples 1-5 described above, the catalysts were manufactured using carbon black and leaves abounding in magnesium porphyrins. The catalysts in Examples 1-5, more specifically, had a magnesium ion as a center, and further had N$_4$-macrocyclic structures and the carbon carrier as skeleton. Besides, —C—S—C— groups in leaves may enhance the oxygen reduction reaction (ORR) activity for catalyst. On the other hand, —C—SO$_x$—C—0 groups in leaves may not be conducive to the ORR activity for catalyst. In the oxidation-reduction reaction, the catalysts of Examples 1-5 may reduce oxygen directly to water by a reaction involving electron transfer of 4 electrons.

Electrochemical Assessment of Catalysts

The ORR activities of the catalysts of Examples 1-5 were evaluated. The method for evaluating the ORR activities of the catalysts are described as follows. Linear scan voltammetry (LSV) was carried out by using a rotating-ring disk electrode (RRDE) on which the catalyst was provided, with an oxygen-saturated 0.1 M KOH electrolyte solution and an electrical potential range of 0.2V to 1.2V. The working electrode was the rotating-ring-disk electrode comprised of a glassy carbon (GC) disk and a platinum ring, the counter electrode was a piece of Pt foil, and the reference electrode was a saturated calomel electrode (SCE). Electrochemical measurements were made by using a potentiostat/galvanostat instrument (Biologic Bi-stat).

Figure 2:
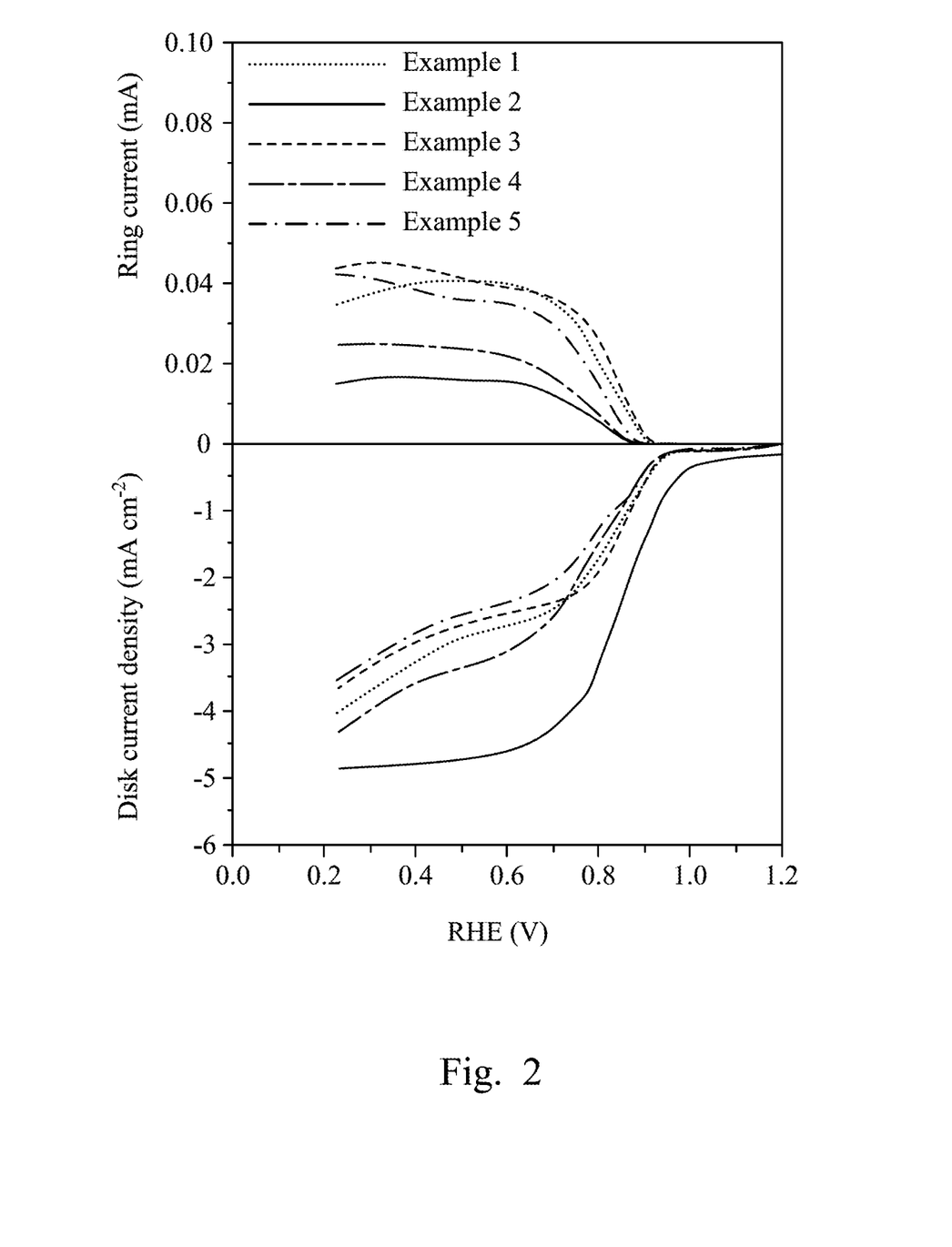
FIG. 2-4 are drawings showing experimental results of oxygen reduction reaction (ORR) test for the catalysts of Examples in accordance with some embodiments of the present disclosure.

FIG. 2 is a drawing showing the experimental results of ORR test for catalysts of Examples 1-5. More specifically, the upper vertical axis represents ring current ($I_r$), the lower vertical axis represents disk current density ($I_d$), and the horizontal axis represents electrical potential, as shown in FIG. 2. All electric potentials were measured in reference to SCE and converted it to reversible hydrogen electrode (RHE) scale for convenience in comparison with other reference papers. As illustrated in FIG. 2, the catalyst treated with 700 watts for 2 minutes (Example 2) shows the best disk limiting current density and the lowest ring current. For obtaining further detailed information, the total electron transfer number (n) and the yield of intermediate product (% HO$_2^-$) are calculated using Equations (1) and (2) below, respectively, where N is the RRDE collection efficiency. Here, the RRDE collection efficiency of the ring is 0.383.

$$n = \frac{4I_d}{I_d + \left(\frac{I_r}{N}\right)} \qquad \text{Equation (1)}$$

$$\% \, HO_2^- = \frac{\frac{2I_r}{N}}{I_d + \frac{I_r}{N}} \times 100\% \qquad \text{Equation (2)}$$

In general, the greater total electron transfer number "n" calculated from Equation (1), within reasonable limits, the better the efficiency of oxygen reduction reaction. On the contrary, the higher the percentage of hydrogen peroxide calculated from Equation (2), within reasonable limits, the lower the efficiency of oxygen reduction reaction. The presence of hydrogen peroxide indicates that oxygen may be reduced to water through another electron transfer scheme involving intermediate products, not directly 4-electron transfer.

In accordance with the results of ORR test for the catalysts of Examples that had been treated with various powers and times of the microwave oven, the total electron transfer numbers and the yields of intermediate product at 0.25V are calculated using the two Equations above. As shown in table 2, the catalyst of Example 2 that had been treated with 700 watts for 2 mins has the greatest total electron transfer number and the lowest yield of intermediate product. The catalyst of Example 3 that had been treated with 700 watts for 3 mins has the smallest total electron transfer number and the highest yield of intermediate product (probably because a large number of porphyrin structures are destroyed by such treatment and reduces its catalytic activity).

TABLE 2

| Example | Total Electron Transfer Number (n) | Yield of Intermediate Product (% HO2—) |
|---|---|---|
| 1 | 3.60 | 20% |
| 2 | 3.90 | 5% |
| 3 | 3.50 | 25% |
| 4 | 3.75 | 12.5% |
| 5 | 3.52 | 24% |

Figure 3:
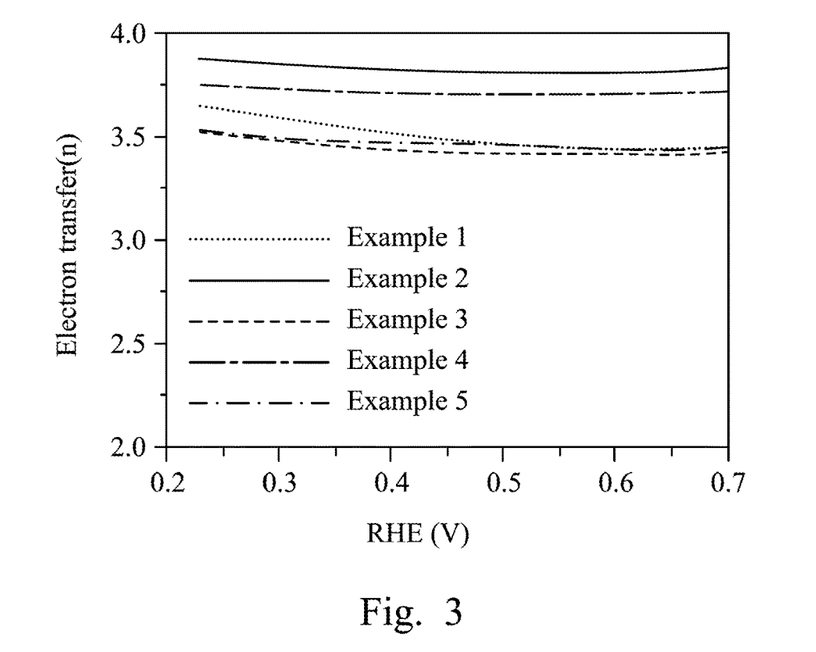
Figure 4:
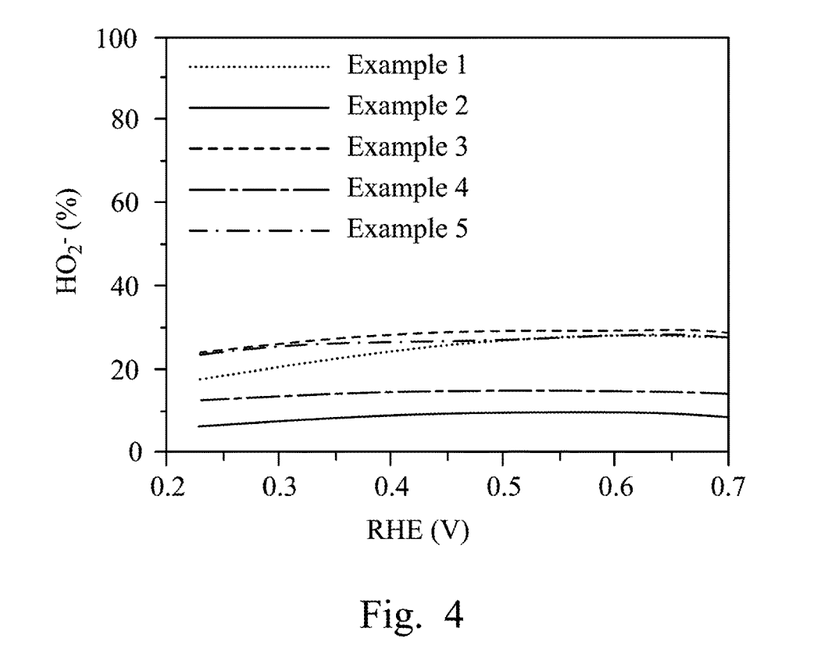

FIG. 3 is a drawing showing the electron transfer numbers calculated based on the results of ORR test associated with the catalysts of Examples 1-5. In FIG. 3, Example 2 (i.e., 700 watts for 2 mins) shows a higher catalytic activity for oxygen reduction because the electron transfer numbers thereof are greater than other examples at any electrical potential. FIG. 4 is a drawing showing the yields of intermediate product associated with the catalysts of Examples 1-5, calculated based on the results of ORR test. In FIG. 4, the catalyst treated with 700 watts for 2 mins exhibits a higher ORR activity because the yield of intermediate product is less than other examples at any electrical potential.

Figure 5:
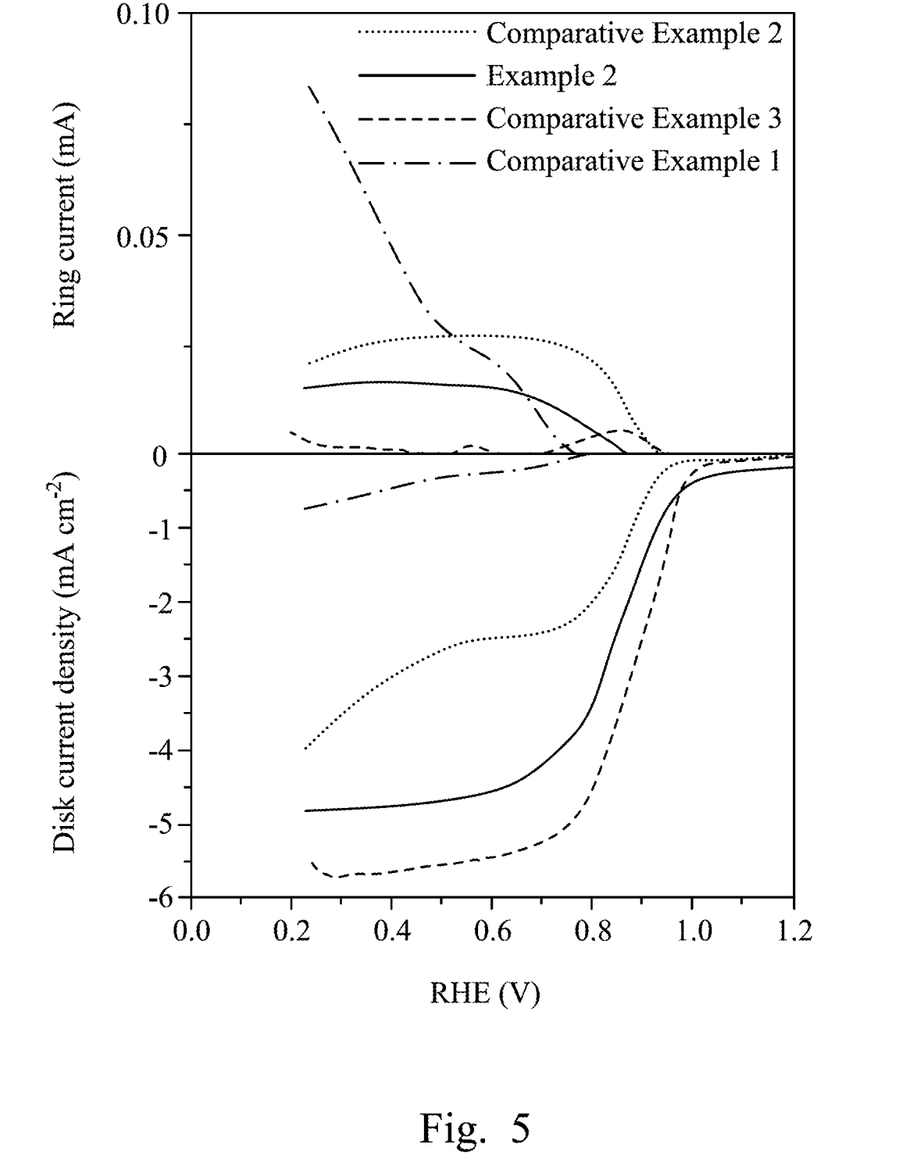
FIG. 5 is a drawing showing experimental results of ORR test for the catalysts of Example 2 and Comparative Examples 1-3.

FIG. 5 is a drawing showing experimental results of ORR test for catalysts of Examples 2 compared with Comparative Examples. More specifically, the catalyst of Comparative Example 3 is a traditional precious metal-based catalyst and exhibits better disk limiting current density and lower ring current. In accordance with the results of ORR test for the catalysts of Example 2 and Comparative Examples treated with the same microwave power and time, the total electron transfer numbers at 0.25V are calculated using the Equation (1) and Equation (2) described above. As shown in table 3 below, as compared with Comparative Example 3 (having the best catalytic activity) which has a total electron transfer number of 3.99, the catalyst of Example 2 is slightly inferior to Comparative Example 3, but still exhibits excellent ORR activity. In contrast, the catalyst made of solely carbon, such as Comparative Example 1, shows a poor total electron transfer number. It is well known that carbon is a non-metallic conductor used as a material for improving ORR activity of catalysts, because it may improve the conductivity.

TABLE 3

| | Total Electron Transfer Number (n) |
|---|---|
| Example 2 | 3.90 |
| Comparative Example 1 | 2.21 |

TABLE 3-continued

| | Total Electron Transfer Number (n) |
|---|---|
| Comparative Example 2 | 3.77 |
| Comparative Example 3 | 3.99 |

Figure 6:
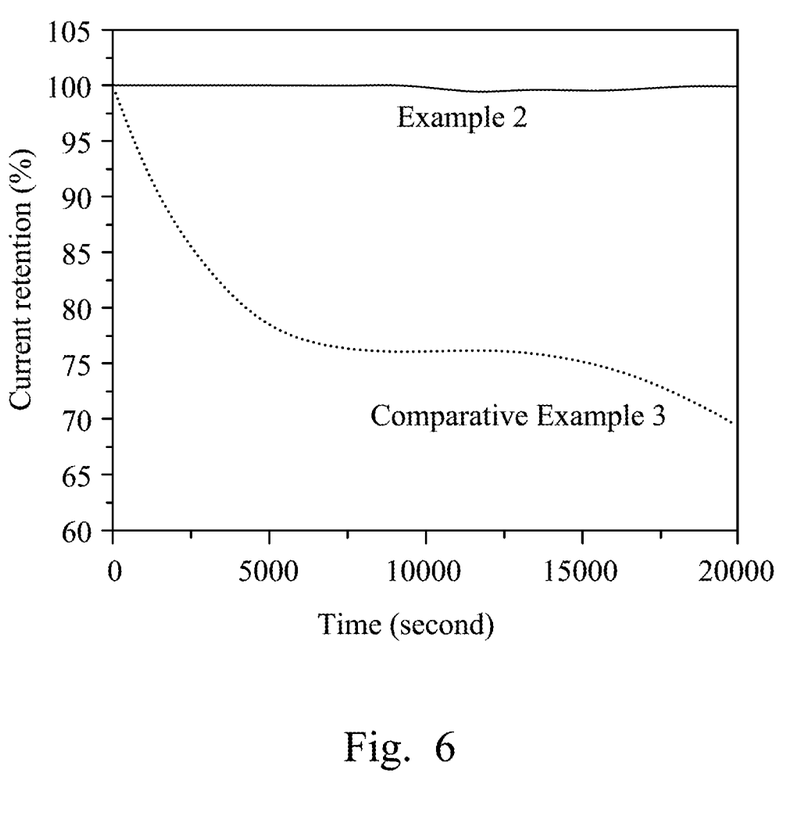
FIG. 6 is a drawing depicting time-varying current decay of the catalysts of Example 2 and Comparative Example 3 under a constant electric potential.

FIG. 6 is a drawing depicting time-varying current decay of the catalysts of Example 2 and Comparative Example 3 under a constant electric potential. For evaluating the current retention rate of the catalysts, chronoamperometry was carried out by using the RRDE with a constant electrical potential of 0.76 in oxygen-saturated 0.1M KOH. As shown in FIG. 6, the horizontal axis represents time (second), and the lower vertical axis represents current retention rate (%). As compared with Comparative Example 3, Example 2 shows excellent stability of current retention rate within or even after 20000 seconds (not shown). To the contrary, the current retention rate of Comparative Example 3 shows continuously decay within 20000 seconds. The decay of the current retention rate in Comparative Example 3 may be caused by the "blocking effect" of the OH species that are adsorbed on Pt surface. However, the catalyst of Example 2 has no such effect.

Compositions of Catalysts

Chemical compositions of the catalysts of Examples 1-5 were analyzed. X-ray photoelectron spectroscopy (XPS) data were obtained at an end station at National Synchrotron Radiation Research Center (Taiwan, NSRRC) using beamline BL24A1. The photoemission spectra were collected using an analyzer (SPECS PHOIBOS 150), and O, C, N, S, Si, and Mg were analyzed. The chemical composition (mol %) of Examples 1-5 are summarized in Table 4 listed below. According to the electrochemical assessment described above, Example 3 exhibits the poorest ORR activity, and as shown in Table 4, the molar percentages of N and S are the lowest (i.e., 13.7% and 2.62% respectively) among all of the Examples. In contrast, Example 2 exhibits the best ORR activity, and the molar percentages of N and S are the highest (i.e., 16.80% and 4.34% resepectively) among all of the Examples. It may reveal that when N and S are doped in the catalyst, they may be the active sites for oxygen reduction and further enhance the ORR activity.

TABLE 4

| | O(mol %) | C(mol %) | N(mol %) | S(mol %) | Si(mol %) | Mg(mol %) |
|---|---|---|---|---|---|---|
| Example 1 | 37.30 | 40.64 | 15.30 | 3.61 | 1.38 | 1.77 |
| Example 2 | 34.60 | 40.84 | 16.80 | 4.34 | 1.57 | 1.85 |
| Example 3 | 31.30 | 47.61 | 13.70 | 2.62 | 2.90 | 1.87 |
| Example 4 | 36.20 | 40.04 | 15.80 | 4.19 | 1.42 | 1.75 |
| Example 5 | 35.80 | 42.05 | 14.10 | 3.12 | 3.10 | 1.83 |

Deconvolved N1s spectra elucidated the molar percentages of quaternary-type nitrogen, pyrrolic-type nitrogen and cyanide of Examples 1-5. The obtained results are listed in Table 5 below. According to the electrochemical assessment described above, Example 3 exhibits the poorest ORR activity, and as shown in Table 5, the molar percentage of quaternary-type nitrogen only accounts for 15.2 mol %. In contrast, Example 2 exhibits the best ORR activity, and the molar percentage of quaternary-type nitrogen is up to 36.1 mol %. It is supposed that the high percentage of quaternary-type nitrogen may enhance ORR activity.

TABLE 5

|  | Quaternary-type Nitrogen (401.4 eV) | Pyrrolic-type Nitrogen (400.3 eV) | Cyanide (399.3 eV) |
| --- | --- | --- | --- |
| Example 1 | 24.6 | 57.2 | 18.2 |
| Example 2 | 36.1 | 41.2 | 22.7 |
| Example 3 | 15.2 | 68.2 | 18.2 |
| Example 4 | 35.6 | 48.9 | 21.8 |
| Example 5 | 21.9 | 56.3 | 19.5 |

Deconvolved S2p spectra elucidated the molar percentages of —C—S—C— groups and —C—$SO_x$—C— groups of Examples 1-5. The results are listed in Table 6 below. According to the electrochemical assessment described above, Example 3 exhibits the poorest ORR activity, and as shown in Table 6, the percentage of the —C—S—C— groups and the —C—$SO_x$—C— groups account for 69.4 mol % and 30.6 mol % respectively. In contrast, Example 2 exhibits the best ORR activity and the percentage of the —C—S—C— groups is up to 100 mol % and no —C—$SO_x$—C— groups is existed. It is supposed that the —C—S—C— group may be the active site for oxygen reduction and further enhance the ORR activity. On the contrary, —C—$SO_x$—C— groups may inhibit the ORR activity.

TABLE 6

|  | —C—S—C— | —C—SOx—C— |
| --- | --- | --- |
| Example 1 | 87.3 | 13.7 |
| Example 2 | 100 | 0 |
| Example 3 | 69.4 | 30.6 |
| Example 4 | 95.3 | 4.7 |
| Example 5 | 85.8 | 14.2 |

As described above, the catalyst for fuel cell, prepared in accordance with embodiments of the present disclosure, provides an improvement over the existing art. According to some embodiments, the present disclosure provides a simple manufacturing method to reduce manufacturing cost and time of catalyst for fuel cell. Besides, the catalyst for fuel cell made through the method described above can maintain high performance and durability for ORR activity. The present disclosure provides improved methods and/or compositions for manufacturing a catalyst for fuel in an efficient and low-cost manner.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A catalyst for fuel cell comprising a magnesium porphyrin and a carbon carrier, and the catalyst further comprising at least six elements comprising oxygen, carbon, nitrogen, sulfur, silicon and magnesium, wherein a molar percentage of oxygen in the six elements is about 31.3 to about 37.3 mol %, a molar percentage of carbon in the six elements is about 40.04 to about 47.61 mol %, a molar percentage of nitrogen in the six elements is about 13.7 to about 16.8 mol %, a molar percentage of sulfur in the six elements is about 2.62 to about 4.34 mol %, a molar percentage of silicon in the six elements is about 1.38 to about 3.1 mol %, and a molar percentage of magnesium in the six elements is about 1.75 to about 1.87 mol %.

2. The catalyst of claim 1, wherein the catalyst comprises quaternary-type nitrogen, pyrrole-type nitrogen and cyanide, and when a total molar percentage of the quaternary-type nitrogen, the pyrrole-type nitrogen and the cyanide is regarded as 100%, a molar percentage of the quaternary-type nitrogen is about 15.2 to about 36.1 mol %, a molar percentage of the pyrrole-type nitrogen is about 41.2 to about 68.2 mol %, and a molar percentage of the cyanide is about 18.2 to about 22.7 mol %.

3. The catalyst of claim 1, wherein the catalyst comprises a —C—S—C— group and —C—$SO_x$—C— groups, and when a total molar percentage of the —C—S—C— group and —C—$SO_x$—C— groups is regarded as 100%, a molar percentage of the —C—S—C— group is about 69.4 to about 100 mol %, and a molar percentage of —C—$SO_x$—C— groups is about 0 to about 30.6 mol %, wherein x is an integer ranged from 0 to 6.

* * * * *